(12) United States Patent
Andersen

(10) Patent No.: US 11,904,954 B2
(45) Date of Patent: Feb. 20, 2024

(54) APPARATUS AND METHOD FOR A SKIRT ASSEMBLY

(71) Applicant: Barry Andersen, Cleveland, TN (US)

(72) Inventor: Barry Andersen, Cleveland, TN (US)

( * ) Notice: Subject to any disclaimer, the term of this patent is extended or adjusted under 35 U.S.C. 154(b) by 305 days.

(21) Appl. No.: 17/568,785

(22) Filed: Jan. 5, 2022

(65) Prior Publication Data

US 2022/0266925 A1   Aug. 25, 2022

Related U.S. Application Data

(60) Provisional application No. 63/152,647, filed on Feb. 23, 2021.

(51) Int. Cl.
*B62D 35/00* (2006.01)

(52) U.S. Cl.
CPC .................................. *B62D 35/001* (2013.01)

(58) Field of Classification Search
CPC .............................. B62D 35/001; B62D 37/02
See application file for complete search history.

(56) References Cited

U.S. PATENT DOCUMENTS

| | | | | |
|---|---|---|---|---|
| 3,218,091 | A * | 11/1965 | Doak | B60P 3/32 |
| | | | | 160/222 |
| 4,193,439 | A * | 3/1980 | Kummerman | E05F 15/51 |
| | | | | 114/201 R |
| 5,280,990 | A * | 1/1994 | Rinard | B62D 35/001 |
| | | | | 296/180.1 |
| 5,735,485 | A * | 4/1998 | Ciprian | B64C 9/32 |
| | | | | 244/113 |
| 7,374,229 | B1 * | 5/2008 | Noll | B62D 25/182 |
| | | | | 296/180.2 |
| 9,522,706 | B1 * | 12/2016 | Breidenbach | B62D 35/001 |
| 10,450,036 | B2 * | 10/2019 | Killian | B63B 17/02 |
| 11,299,217 | B1 * | 4/2022 | James | B62D 35/001 |
| 2003/0057736 | A1 * | 3/2003 | Long | B62D 35/001 |
| | | | | 296/180.4 |
| 2003/0227194 | A1 * | 12/2003 | Farlow | B62D 35/001 |
| | | | | 296/180.4 |
| 2004/0119319 | A1 * | 6/2004 | Reiman | B62D 35/001 |
| | | | | 296/180.1 |

(Continued)

FOREIGN PATENT DOCUMENTS

| | | | | | |
|---|---|---|---|---|---|
| CN | 101378949 | A * | 3/2009 | ......... | B62D 33/0612 |
| EP | 3650322 | A1 * | 5/2020 | ........... | B62D 35/001 |

(Continued)

*Primary Examiner* — Lori Lyjak
(74) *Attorney, Agent, or Firm* — Chambliss, Bahner & Stophel, P.C.; Stephen D. Adams

(57) ABSTRACT

A skirt assembly adapted for use on a motor vehicle including a first panel that is pivotally attached to the motor vehicle, a second panel that is pivotally attached to the first panel, a first rod that is pivotally attached to the first panel, a second rod that is pivotally attached to the second panel, a first actuator that is pivotally attached to the motor vehicle and pivotally attached to the first panel and the second panel. The first actuator is adapted to move between a retracted position and an extended position, and the skirt assembly is adapted to be moved between an open position and a closed position when the first actuator moves between the extended position and the retracted position.

20 Claims, 8 Drawing Sheets

(56) References Cited

U.S. PATENT DOCUMENTS

| | | | |
|---|---|---|---|
| 2006/0152038 A1* | 7/2006 | Graham | B60R 19/565 296/180.1 |
| 2007/0024087 A1* | 2/2007 | Skopic | B62D 35/001 296/180.4 |
| 2007/0120397 A1* | 5/2007 | Layfield | B62D 35/001 296/180.4 |
| 2007/0176466 A1* | 8/2007 | Dolan | B62D 35/001 296/203.03 |
| 2007/0200390 A1* | 8/2007 | Lotarev | B62D 33/0612 296/180.2 |
| 2008/0048468 A1* | 2/2008 | Holubar | B62D 35/001 296/180.4 |
| 2008/0061598 A1* | 3/2008 | Reiman | B62D 35/001 296/180.4 |
| 2008/0093887 A1* | 4/2008 | Wood | B62D 35/001 296/180.4 |
| 2008/0100071 A1* | 5/2008 | Browne | B62D 25/182 292/341.17 |
| 2009/0146000 A1* | 6/2009 | Bushnell | B64C 9/10 244/46 |
| 2009/0189414 A1* | 7/2009 | Boivin | B62D 35/001 296/180.1 |
| 2009/0195017 A1* | 8/2009 | Wood | B62D 35/001 296/180.4 |
| 2009/0212596 A1* | 8/2009 | Reiman | B62D 35/008 296/180.4 |
| 2009/0230726 A1* | 9/2009 | Reiman | B62D 35/001 296/180.4 |
| 2010/0072779 A1* | 3/2010 | Pfaff | B62D 35/001 296/180.2 |
| 2010/0194143 A1* | 8/2010 | Perkins | B62D 35/001 296/180.1 |
| 2010/0201152 A1* | 8/2010 | Smith | B62D 35/001 296/180.3 |
| 2010/0231000 A1* | 9/2010 | Andrus | B62D 35/001 296/180.4 |
| 2011/0042998 A1* | 2/2011 | Rinehart | B62D 35/001 296/180.3 |
| 2011/0285167 A1* | 11/2011 | Butler | B62D 35/001 296/180.1 |
| 2012/0074728 A1* | 3/2012 | Senatro | B62D 35/001 296/180.4 |
| 2012/0091754 A1* | 4/2012 | Lee | B62D 35/001 296/180.4 |
| 2012/0223544 A1* | 9/2012 | Benton | B62D 35/001 296/180.1 |
| 2013/0008917 A1* | 1/2013 | Huang | E06B 3/483 49/358 |
| 2013/0076066 A1* | 3/2013 | Wong | B62D 35/001 296/180.4 |
| 2013/0249241 A1* | 9/2013 | Baker | B62D 35/001 296/180.4 |
| 2014/0028050 A1* | 1/2014 | Rodriguez | B62D 35/001 296/180.4 |
| 2016/0096558 A1* | 4/2016 | Bassily | B62D 35/02 296/180.4 |
| 2016/0121684 A1* | 5/2016 | Czlapinski | B60G 17/0275 280/5.504 |
| 2016/0200377 A1* | 7/2016 | Grandominico | B62D 35/007 296/180.4 |
| 2016/0236726 A1* | 8/2016 | Baker | B62D 35/001 |
| 2017/0174271 A1* | 6/2017 | Baker | B62D 35/001 |
| 2017/0217506 A1* | 8/2017 | Bezner | B62D 35/02 |
| 2018/0043944 A1* | 2/2018 | Magee | B62D 35/001 |
| 2018/0148107 A1* | 5/2018 | Burrows | B62D 37/02 |
| 2018/0244228 A1* | 8/2018 | Desjardins | B60R 19/565 |
| 2019/0071138 A1* | 3/2019 | Burrows | B62D 37/02 |
| 2019/0071139 A1* | 3/2019 | Burrows | B62D 37/02 |
| 2020/0307724 A1* | 10/2020 | Burrows | B62D 35/001 |
| 2021/0079644 A1* | 3/2021 | Jewell | E04B 1/34336 |
| 2021/0129923 A1* | 5/2021 | Burrows | B62D 37/02 |
| 2021/0139086 A1* | 5/2021 | Andrus | B62D 37/02 |
| 2023/0105775 A1* | 4/2023 | Patel | B60J 5/06 49/70 |

FOREIGN PATENT DOCUMENTS

| | | | | |
|---|---|---|---|---|
| EP | 3670308 A1 * | 6/2020 | | B62D 35/001 |
| WO | WO-2016154224 A1 * | 9/2016 | | B62D 35/00 |

\* cited by examiner

APPARATUS AND METHOD FOR A SKIRT ASSEMBLY

CROSS-REFERENCES TO RELATED APPLICATIONS/PATENTS

This application relates back to and claims the benefit of priority from U.S. Provisional Application for Patent Ser. No. 63/152,647 titled "Apparatus and Method for Skirt Assembly" and filed on Feb. 23, 2021.

FIELD OF THE INVENTION

The present invention relates generally to apparatuses and methods for skirt assemblies, and particularly to apparatuses and methods for collapsible skirt assemblies adapted for use on motor vehicles.

BACKGROUND AND DESCRIPTION OF THE PRIOR ART

It is known to use apparatuses and methods to improve the aerodynamics of a motor vehicle. Conventional apparatuses and methods, however, suffer from one or more disadvantages. For example, conventional skirt assemblies and methods do not sufficiently reduce the size of gaps, drag, turbulence, and weight. Conventional skirt assemblies and methods also do not sufficiently improve aerodynamics, mileage, vehicle stability, and skirt assembly durability and lifespan. Further, conventional skirt assemblies and methods do not sufficiently reduce maintenance, repair, and/or replacement costs. Still further, conventional skirt assemblies and methods are not sufficiently long and do not sufficiently extend greater distances. In addition, conventional skirt assemblies and methods are undesirably complex and difficult to install and/or retrofit. Conventional skirt assemblies are also insufficiently capable of negotiating sharp turns, speed bumps, railroad tracks, snow, mud, and the like without damage. In addition, conventional skirt assemblies are not sufficiently capable of being disposed at multiple locations on a motor vehicle, including the rear, front top, front sides, and undercarriage. Further, conventional skirt assemblies and methods are not adapted to be controlled remotely by GPS, speedometer, and/or manually.

It would be desirable, therefore, if an apparatus and method for a skirt assembly could be provided that would reduce the size of gaps, drag, turbulence, and weight. It would also be desirable if such an apparatus and method for a skirt assembly could be provided that would improve aerodynamics, mileage, vehicle stability, and skirt assembly durability and lifespan. It would be further desirable if such an apparatus and method for a skirt assembly could be provided that would reduce maintenance, repair, and replacement costs. It would be still further desirable if such an apparatus and method for a skirt assembly could be provided that would be longer and extend greater distances. In addition, it would be desirable if such an apparatus and method for a skirt assembly could be provided that would be less complex and easier to install and/or retrofit. It would also be desirable if such an apparatus and method for a skirt assembly could be provided that would be capable of negotiating sharp turns, speed bumps, railroad tracks, snow, mud, and the like without damage. Further, it would be desirable if such an apparatus and method for a skirt assembly could be provided that would be capable of being disposed at multiple locations on a motor vehicle, including the rear, front top, front sides, and undercarriage. Still further, it would be desirable if such an apparatus and method for a skirt assembly could be provided that would be adapted to be controlled remotely by GPS, speedometer, and/or manually.

ADVANTAGES OF THE PREFERRED EMBODIMENTS OF THE INVENTION

Accordingly, it is an advantage of the preferred embodiments of the invention claimed herein to provide an apparatus and method for a skirt assembly that reduces the size of gaps, drag, turbulence, and weight. It is also an advantage of the preferred embodiments of the invention claimed herein to provide an apparatus and method for a skirt assembly that improves aerodynamics, mileage, vehicle stability, and skirt assembly durability and lifespan. It is another advantage of the preferred embodiments of the invention claimed herein to provide an apparatus and method for a skirt assembly that reduces maintenance, repair, and replacement costs. It is still another advantage of the preferred embodiments of the invention claimed herein to provide an apparatus and method for a skirt assembly that is longer and extends greater distances. It is yet another advantage of the preferred embodiments of the invention claimed herein to provide an apparatus and method for a skirt assembly that is simpler, less complex, and easily retrofitted and/or installed. In addition, it is an advantage of the preferred embodiments of the invention claimed herein to provide an apparatus and method for a skirt assembly that is capable of negotiating sharp turns, speed bumps, railroad tracks, snow, mud, etc. without damage. It is an additional advantage of the preferred embodiments of the invention claimed herein to provide an apparatus and method for a skirt assembly that may be disposed at multiple locations on a motor vehicle, including the rear, front top, front sides, and undercarriage. It is also an advantage of the preferred embodiments of the invention claimed herein to provide an apparatus and method for a skirt assembly that may be controlled remotely by GPS, speedometer, and/or manually.

Additional advantages of the preferred embodiments of the invention will become apparent from an examination of the drawings and the ensuing description.

EXPLANATION OF THE TECHNICAL TERMS

The use of the terms "a," "an," "the," and similar terms in the context of describing the invention are to be construed to cover both the singular and the plural, unless otherwise indicated herein or clearly contradicted by context. The terms "comprising" "having," "including," and "containing" are to be construed as open-ended terms (i.e., meaning "including, but not limited to,") unless otherwise noted. The terms "substantially," "generally," and other words of degree are relative modifiers intended to indicate permissible variation from the characteristic so modified. The use of such terms in describing a physical or functional characteristic of the invention is not intended to limit such characteristic to the absolute value that the term modifies, but rather to provide an approximation of the value of such physical or functional characteristic. All methods described herein can be performed in any suitable order unless otherwise specified herein or clearly indicated by context.

Terms concerning attachments, coupling and the like, such as "attached," "connected," and "interconnected," refer to a relationship wherein structures are secured or attached to one another either directly or indirectly through intervening structures, as well as both moveable and rigid attachments or relationships, unless specified herein or clearly indicated by context. The term "operatively connected" is such an attachment, coupling or connection that allows the pertinent structures to operate as intended by virtue of that relationship.

The use of any and all examples or exemplary language (e.g., "such as," "preferred," and "preferably") herein is intended merely to better illuminate the invention and the preferred embodiments thereof, and not to place a limitation on the scope of the invention. Nothing in the specification should be construed as indicating any element as essential to the practice of the invention unless so stated with specificity. Several terms are specifically defined herein. These terms are to be given their broadest reasonable construction consistent with such definitions, as follows:

As used herein, the term "actuator" means any device, mechanism, assembly, or combination thereof that is adapted to move or be moved between a retracted position and an extended position so as to impart a mechanical force. The term "actuator" includes without limitation linear actuators, rotary actuators, hydraulic cylinders, hydraulic rotary actuators, pneumatic cylinders, air cylinders, electric screw assemblies, manual or mechanical screw assemblies, springs, and the like.

As used herein, the term "means for moving the second panel between an open position and a closed position" means any device, mechanism, assembly, or combination thereof that is adapted to urge the second panel into an open position when the actuator is in the extended position and urge the second panel into a closed position when the actuator is in the retracted position. The term "means for moving the second panel between an open position and a closed position" includes without limitation spring-loaded devices, rods, linkage, and the like.

SUMMARY OF THE INVENTION

The apparatus of the invention comprises a skirt assembly adapted for use on a motor vehicle. The preferred skirt assembly includes a first panel having a first panel proximal end and a first panel distal end spaced apart from the first panel proximal end. The preferred first panel proximal end is pivotally attached to the motor vehicle. The skirt assembly also includes a second panel having a second panel proximal end and a second panel distal end spaced apart from the second panel proximal end. The second panel proximal end is pivotally attached to the first panel distal end. The skirt assembly further includes a first rod having a first rod lateral end and a first rod medial end spaced apart from the first rod lateral end. The first rod lateral end is pivotally attached to the first panel between the first panel proximal end and the first panel distal end. The skirt assembly still further includes a second rod having a second rod lateral end and a second rod medial end spaced apart from the second rod lateral end. The second rod lateral end is pivotally attached to the second panel between the second panel proximal end and the second panel distal end. In addition, the skirt assembly includes a first actuator having a first actuator proximal end and a first actuator distal end spaced apart from the first actuator proximal end. The first actuator proximal end is pivotally attached to the motor vehicle, and the first actuator distal end is pivotally attached to the first panel distal end and the second panel proximal end. The first actuator is adapted to move between a retracted position and an extended position, and the skirt assembly is adapted to be moved between an open position and a closed position when the first actuator moves between the extended position and the retracted position.

In an alternative embodiment of the apparatus of the invention, the preferred skirt assembly, the preferred skirt assembly comprises a first panel having a first panel proximal end and a first panel distal end spaced apart from the first panel proximal end. The preferred first panel proximal end is pivotally attached to the motor vehicle. The preferred skirt assembly also comprises a second panel having a second panel proximal end and a second panel distal end spaced apart from the second panel proximal end. The preferred second panel proximal end is pivotally attached to the first panel distal end. The preferred skirt assembly further comprises a first actuator having a first actuator proximal end and a first actuator distal end spaced apart from the first actuator proximal end. The preferred first actuator proximal end is pivotally attached to the motor vehicle, and the preferred first actuator distal end is pivotally attached to the first panel between the first panel proximal end and the first panel distal end. The preferred skirt assembly still further comprises a means for moving the second panel between an open position and a closed position. Preferably, the first actuator is adapted to move between a retracted position and an extended position, and the first panel of the skirt assembly is adapted to be moved between an open position and a closed position when the first actuator moves between the extended position and the retracted position.

The method of the invention comprises a method for controlling a skirt assembly. The preferred method comprises providing a skirt assembly adapted for use on a motor vehicle. The preferred skirt assembly includes a first panel having a first panel proximal end and a first panel distal end spaced apart from the first panel proximal end. The preferred first panel proximal end is pivotally attached to the motor vehicle. The skirt assembly also includes a second panel having a second panel proximal end and a second panel distal end spaced apart from the second panel proximal end. The second panel proximal end is pivotally attached to the first panel distal end. The skirt assembly further includes a first rod having a first rod lateral end and a first rod medial end spaced apart from the first rod lateral end. The first rod lateral end is pivotally attached to the first panel between the first panel proximal end and the first panel distal end. The skirt assembly still further includes a second rod having a second rod lateral end and a second rod medial end spaced apart from the second rod lateral end. The second rod lateral end is pivotally attached to the second panel between the second panel proximal end and the second panel distal end. In addition, the skirt assembly includes a first actuator having a first actuator proximal end and a first actuator distal end spaced apart from the first actuator proximal end. The first actuator proximal end is pivotally attached to the motor vehicle, and the first actuator distal end is pivotally attached to the first panel distal end and the second panel proximal end. The first actuator is adapted to move between a retracted position and an extended position, and the skirt assembly is adapted to be moved between an open position and a closed position when the first actuator moves between the extended position and the retracted position. The preferred method further comprises moving the first actuator between the retracted position and the extended position.

In an alternative method for controlling a skirt assembly, the method comprising providing a skirt assembly adapted for use on a motor vehicle. The preferred skirt assembly comprises a first panel having a first panel proximal end and a first panel distal end spaced apart from the first panel proximal end. The preferred first panel proximal end is pivotally attached to the motor vehicle. The preferred skirt assembly also comprises a second panel having a second panel proximal end and a second panel distal end spaced apart from the second panel proximal end. The preferred second panel proximal end is pivotally attached to the first panel distal end. The preferred skirt assembly further comprises a first actuator having a first actuator proximal end and a first actuator distal end spaced apart from the first actuator proximal end. The preferred first actuator proximal end is pivotally attached to the motor vehicle, and the preferred first actuator distal end is pivotally attached to the first panel between the first panel proximal end and the first panel distal end. The preferred skirt assembly still further comprises a means for moving the second panel between an open position and a closed position. Preferably, the first actuator is adapted to move between a retracted position and an extended position, and the first panel of the skirt assembly is adapted to be moved between an open position and a closed position when the first actuator moves between the extended position and the retracted position. The preferred method also comprises moving the first actuator between the retracted position and the extended position and moving the second panel between the closed position and the open position.

BRIEF DESCRIPTION OF THE DRAWINGS

The presently preferred embodiments of the invention are illustrated in the accompanying drawings, in which like reference numerals represent like parts throughout, and in which.

DESCRIPTION OF THE PREFERRED EMBODIMENTS OF THE INVENTION

Figure 1:
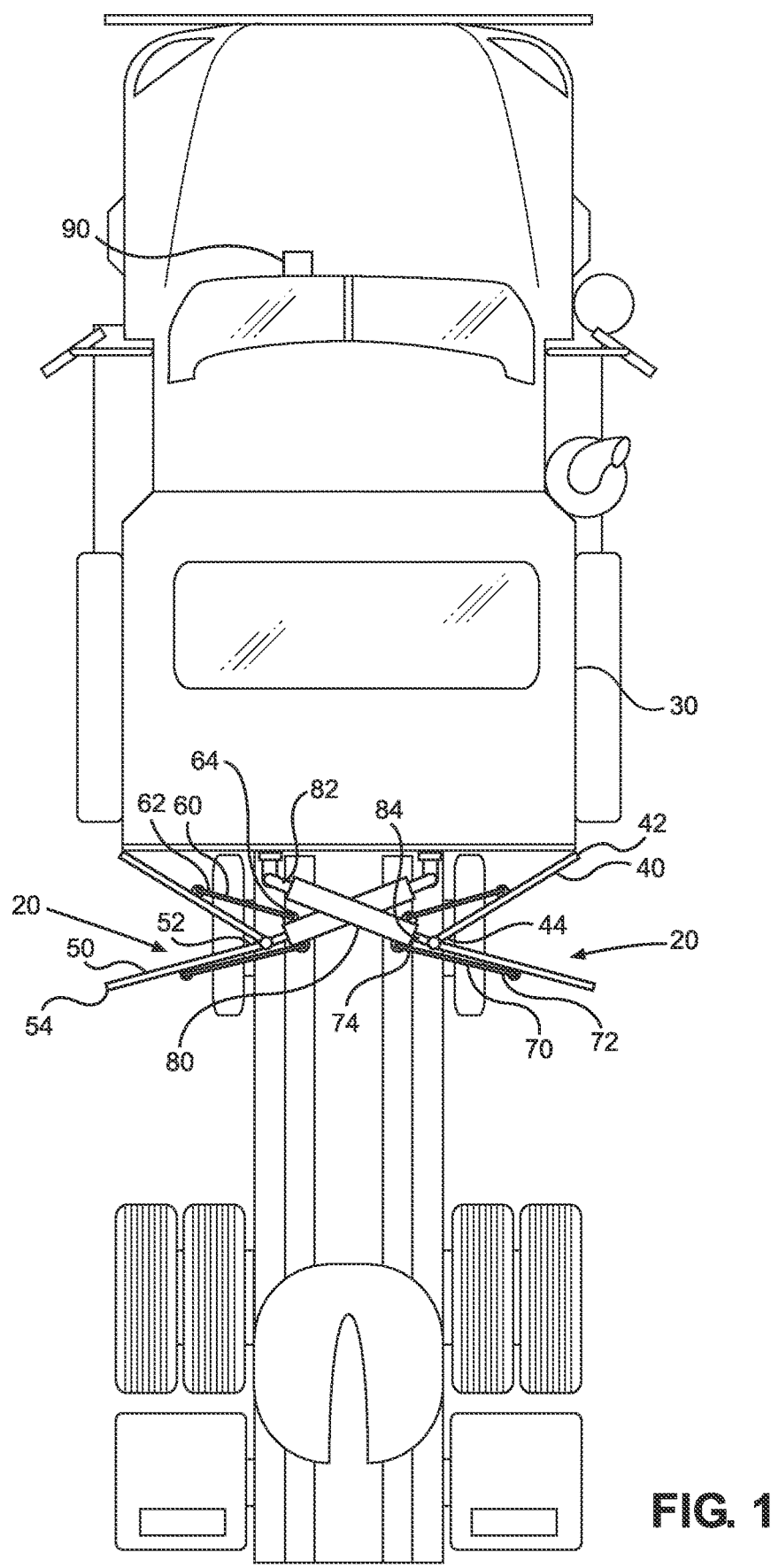
FIG. 1 is a top view of a pair of the preferred embodiment of the skirt assembly in accordance with the present invention shown on an exemplary motor vehicle in a partially closed position.

Referring now to the drawings, the preferred embodiment of the skirt assembly in accordance with the present invention is illustrated by FIGS. 1 through 8. Referring now to FIG. 1, a top view of a pair of the preferred embodiments of the skirt assembly in accordance with the present invention shown on an exemplary motor vehicle in a partially closed position is illustrated. As shown in FIG. 1, the preferred skirt assembly is designated generally by reference numeral 20 and the exemplary motor vehicle is designated generally by reference numeral 30. Preferred skirt assembly 20 is adapted for use on a motor vehicle. Preferred skirt assembly 20 comprises first panel 40 having first panel proximal end 42 and first panel distal end 44 spaced apart from the first panel proximal end. Preferably, first panel proximal end 42 is pivotally attached to motor vehicle 30. Preferred skirt assembly 20 also comprises second panel 50 having second panel proximal end 52 and second panel distal end 54 spaced apart from the second panel proximal end. Preferably, second panel proximal end 52 is pivotally attached to first panel distal end 54.

Still referring to FIG. 1, preferred skirt assembly 20 further comprises first rod 60 having first rod lateral end 62 and first rod medial end 64 spaced apart from the first rod lateral end. Preferably, first rod lateral end 62 is pivotally attached to first panel 40 between first panel proximal end 42 and first panel distal end 44. Preferred skirt assembly 20 still further comprises second rod 70 having second rod lateral end 72 and second rod medial end 74 spaced apart from the second rod lateral end. Preferably, second rod lateral end 72 is pivotally attached to second panel 50 between second panel proximal end 52 and second panel distal end 54.

Still referring to FIG. 1, preferred skirt assembly 20 also comprises first actuator 80 having first actuator proximal end 82 and first actuator distal end 84 spaced apart from the first actuator proximal end. Preferably, first actuator proximal end 82 is pivotally attached to motor vehicle 30, and first actuator distal end 84 is pivotally attached to first panel distal end 44 and the second panel proximal end 52. In some preferred embodiments of skirt assembly 20, preferred actuator comprises a hydraulic cylinder. In addition, in the preferred embodiments of skirt assembly 20, first actuator 80 is adapted to move between a retracted position and an extended position, and the skirt assembly is adapted to be moved between an open position and a closed position when the first actuator moves between the extended position and the retracted position.

Still referring to FIG. 1, preferred skirt assembly 20 comprises means for controlling the assembly 90. Preferably, means for controlling the assembly 90 is adapted to remotely and automatically control the assembly and may comprise a global positioning satellite assembly and a speedometer. It is also contemplated within the scope of the invention that means for controlling the assembly 90 may be manually operated. While FIG. 1 illustrates the preferred configuration and arrangement of preferred skirt assembly 20, it is contemplated within the scope of the invention that the skirt assembly, including but not limited to means for controlling the assembly 90, may be of any suitable configuration and arrangement. It is also contemplated within the scope of the invention that preferred skirt assembly 20 could extend outside the front wheels of the trailer so as to cover part or all of the front wheels of the trailer.

Figure 2:
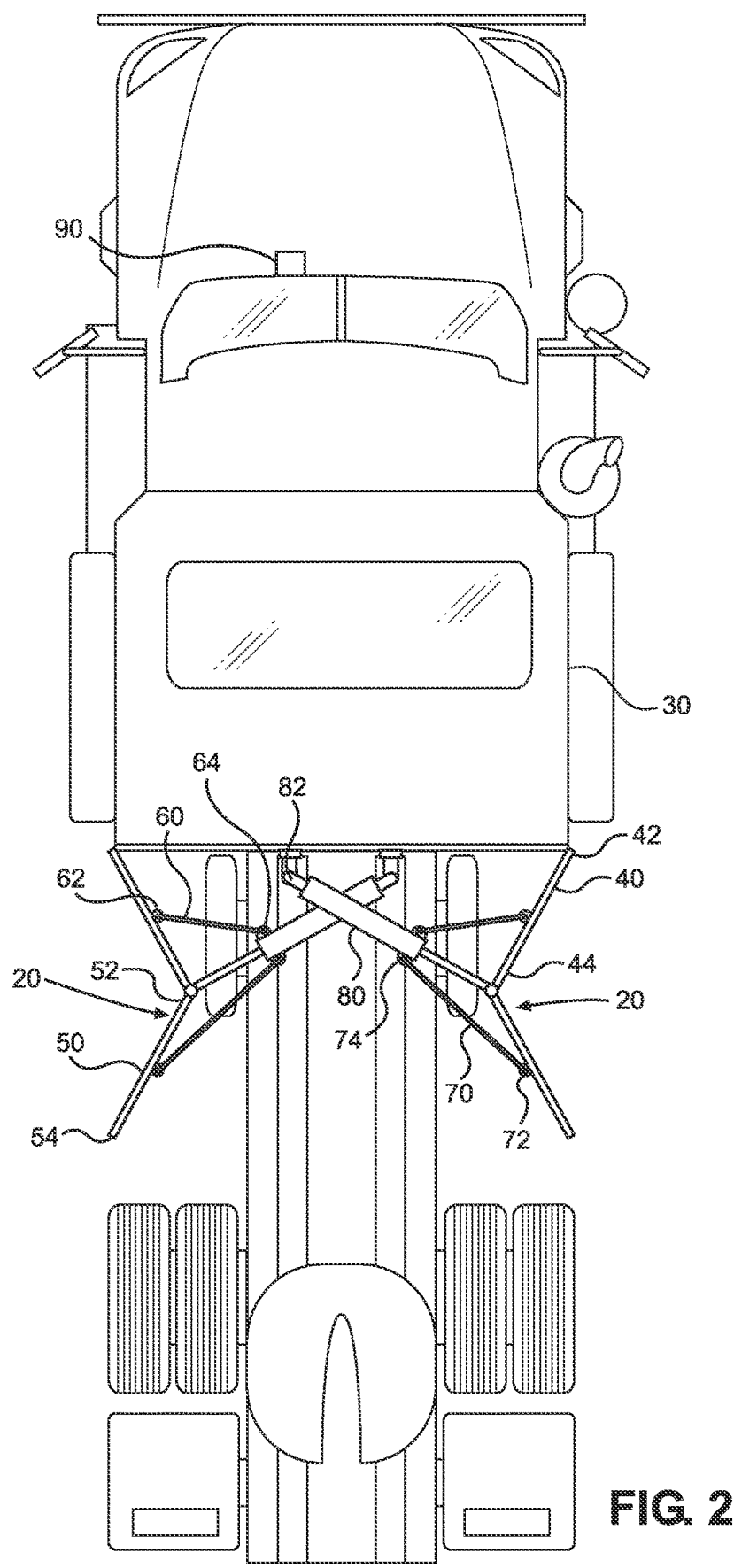
FIG. 2 is a top view of a pair of the preferred skirt assemblies illustrated in FIG. 1 shown on an exemplary motor vehicle in a partially open position.

Referring now to FIG. 2, a top view of a pair of preferred skirt assemblies 20 is illustrated on exemplary motor vehicle 30 in a partially open position. As shown in FIG. 2, preferred skirt assembly 20 is adapted for use on motor vehicle 30. Preferred skirt assembly 20 comprises first panel 40, first panel proximal end 42, first panel distal end 44, second panel 50, second panel proximal end 52, second panel distal end 54, first rod 60, first rod lateral end 62, first rod medial end 64, second rod 70, second rod lateral end 72, second rod medial end 74, first actuator 80, first actuator proximal end 82, first actuator distal end 84, and means for controlling the assembly 90.

Figure 3:
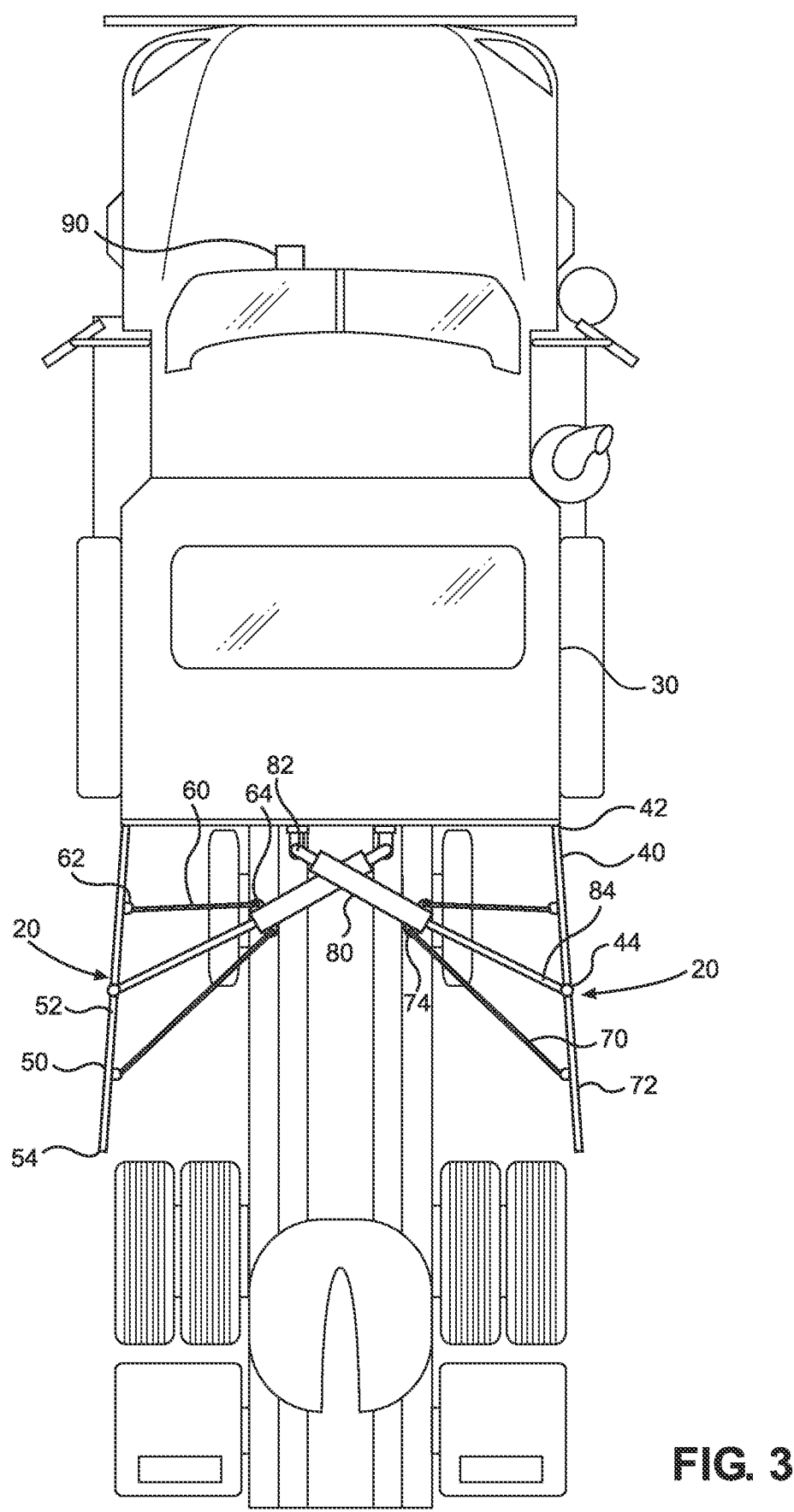
FIG. 3 is a top view of a pair of the preferred skirt assemblies illustrated in FIGS. 1-2 shown on an exemplary motor vehicle in a fully open position.

Referring now to FIG. 3, a top view of a pair of preferred skirt assemblies 20 is illustrated on exemplary motor vehicle 30 in a fully open position. As shown in FIG. 3, preferred skirt assembly 20 is adapted for use on motor vehicle 30. Preferred skirt assembly 20 comprises first panel 40, first panel proximal end 42, first panel distal end 44, second panel 50, second panel proximal end 52, second panel distal end 54, first rod 60, first rod lateral end 62, first rod medial end 64, second rod 70, second rod lateral end 72, second rod medial end 74, first actuator 80, first actuator proximal end 82, first actuator distal end 84, and means for controlling the assembly 90.

Figure 4:
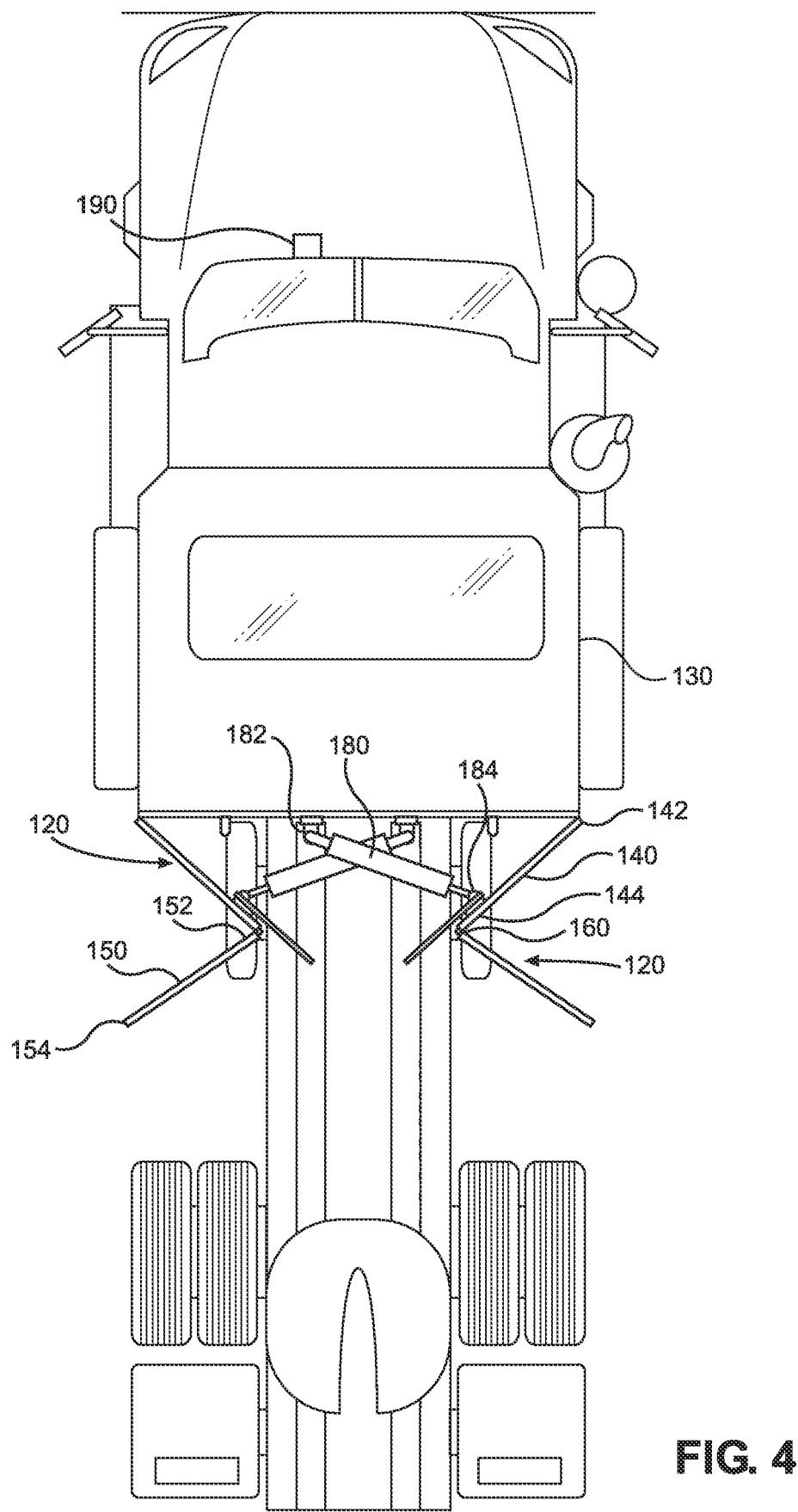
FIG. 4 is a top view of a pair of a first alternative embodiment of the skirt assembly in accordance with the present invention shown on an exemplary motor vehicle in a partially closed position.

Referring now to FIG. 4, a top view of a pair of first alternative embodiments of the skirt assembly in accordance with the present invention shown on an exemplary motor vehicle in a partially closed position is illustrated. As shown in FIG. 4, the first alternative embodiment of the skirt assembly is designated generally by reference numeral 120 and the exemplary motor vehicle is designated generally by reference numeral 130. Preferred skirt assembly 120 is adapted for use on motor vehicle 130. Preferred skirt assembly 120 comprises first panel 140 having first panel proximal end 142 and first panel distal end 144 spaced apart from the first panel proximal end. Preferably, first panel proximal end 142 is pivotally attached to motor vehicle 130. Preferred skirt assembly 120 also comprises second panel 150 having second panel proximal end 152 and second panel distal end 154 spaced apart from the second panel proximal end. Preferably, second panel proximal end 152 is pivotally attached to first panel distal end 154.

Still referring to FIG. 4, preferred skirt assembly 120 further comprises means for moving the second panel between an open position and a closed position 160. Preferably, means for moving the second panel between an open position and a closed position 160 is adapted to move the second panel between an open position and a closed position when the actuator moves between an extended position and a closed position. It is contemplated within the scope of the invention that preferred means for moving the second panel between an open position and a closed position 160 comprises a spring-loaded device, rods, linkage, and/or the like.

Still referring to FIG. 4, preferred skirt assembly 120 also comprises first actuator 180 having first actuator proximal end 182 and first actuator distal end 184 spaced apart from the first actuator proximal end. Preferably, first actuator proximal end 182 is pivotally attached to motor vehicle 30, and first actuator distal end 184 is pivotally attached to first panel distal end 144 and the second panel proximal end 152. In some preferred embodiments of skirt assembly 120, preferred actuator comprises a hydraulic cylinder. In addition, in the preferred embodiments of skirt assembly 120, first actuator 180 is adapted to move between a retracted position and an extended position, and first panel 140 is adapted to be moved between an open position and a closed position when the first actuator moves between the extended position and the retracted position.

Still referring to FIG. 4, preferred skirt assembly 120 still further comprises means for controlling the assembly 190. Preferably, means for controlling the assembly 190 is adapted to remotely and automatically control the assembly and may comprise a global positioning satellite assembly and a speedometer. It is also contemplated within the scope of the invention that means for controlling the assembly 90 may be manually operated. While FIG. 4 illustrates the preferred configuration and arrangement of preferred skirt assembly 120, it is contemplated within the scope of the invention that the skirt assembly, including but not limited to means for controlling the assembly 190, may be of any suitable configuration and arrangement. It is also contemplated within the scope of the invention that preferred skirt assembly 120 could extend outside the front wheels of the trailer so as to cover part or all of the front wheels of the trailer.

Figure 5:
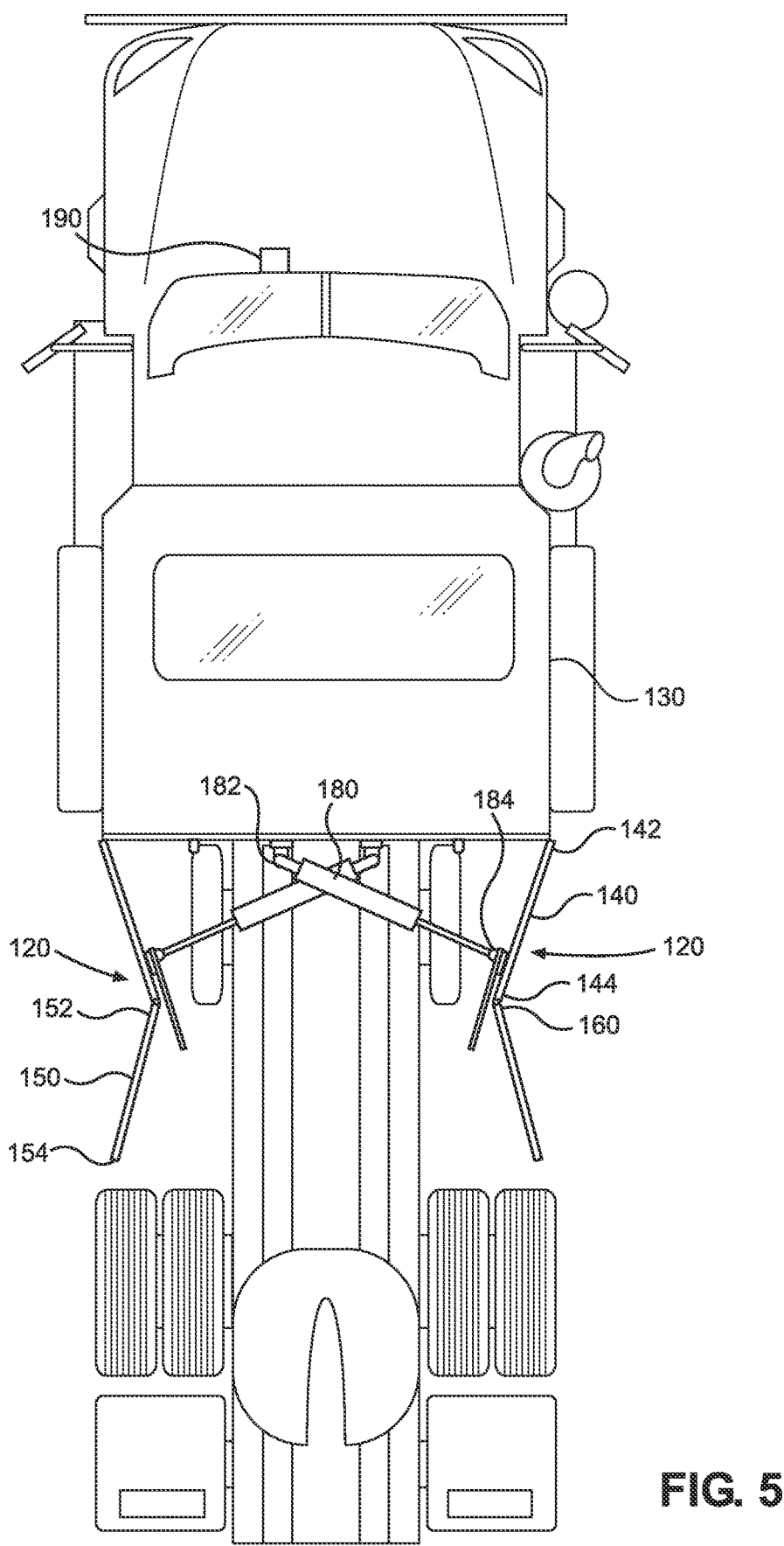
FIG. 5 is a top view of a pair of the preferred skirt assemblies illustrated in FIG. 4 shown on an exemplary motor vehicle in a partially open position.

Referring now to FIG. 5, a top view of a pair of preferred skirt assemblies 120 is illustrated on exemplary motor vehicle 130 in a partially open position. As shown in FIG. 5, preferred skirt assembly 120 comprises first panel 140, first panel proximal end 142, first panel distal end 144, second panel 150, second panel proximal end 152, second panel distal end 154, means for moving the second panel between an open position and a closed position 160, first actuator 180, first actuator proximal end 182, first actuator distal end 184, and means for controlling the assembly 190.

Figure 6:
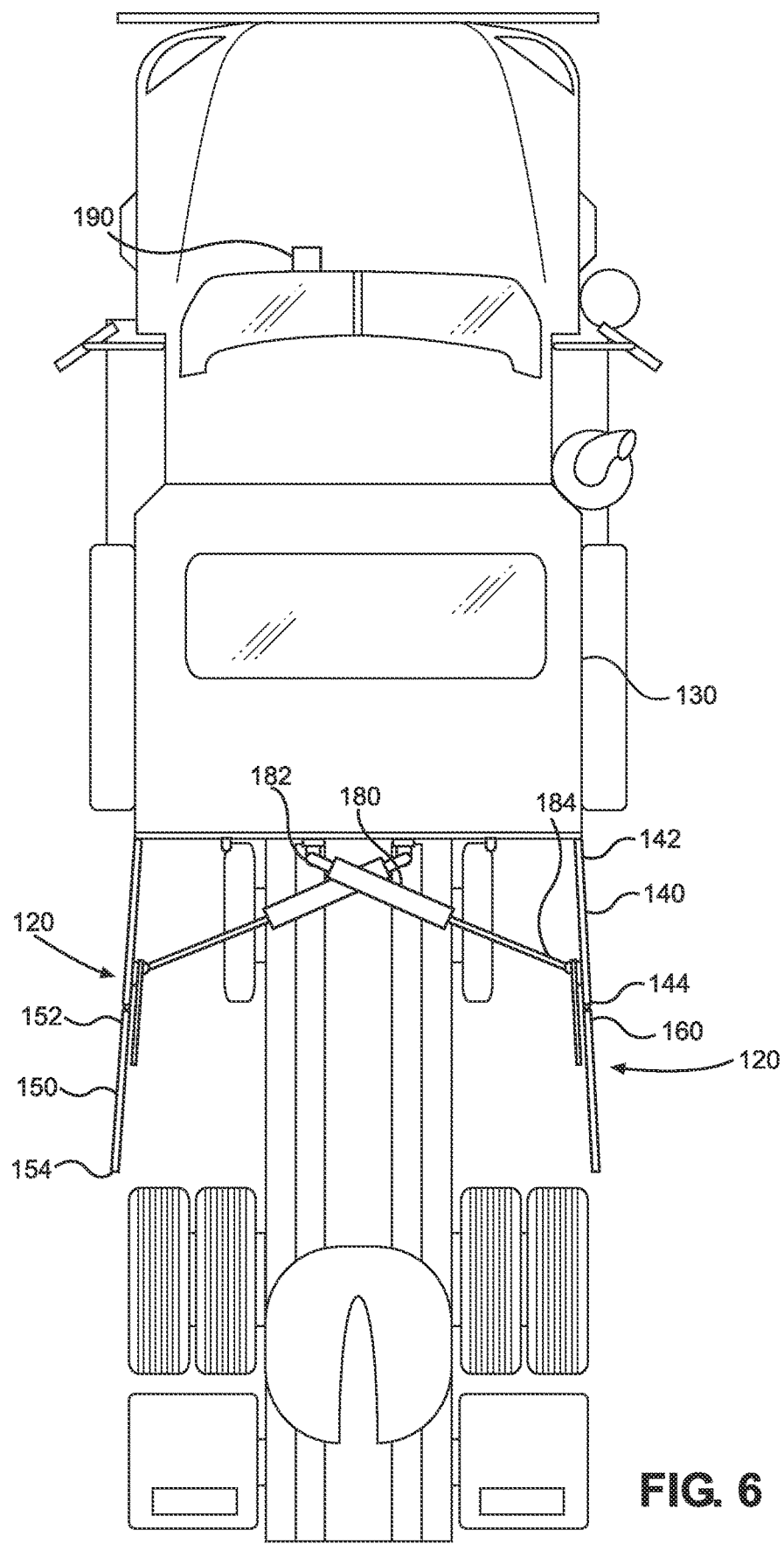
FIG. 6 is a top view of a pair of the preferred skirt assemblies illustrated in FIGS. 4-5 shown on an exemplary motor vehicle in a fully open position.

Referring now to FIG. 6, a top view of a pair of preferred skirt assemblies 120 is illustrated on exemplary motor vehicle 130 in a fully open position. As shown in FIG. 6, preferred skirt assembly 120 comprises first panel 140, first panel proximal end 142, first panel distal end 144, second panel 150, second panel proximal end 152, second panel distal end 154, means for moving the second panel between an open position and a closed position 160, first actuator 180, first actuator proximal end 182, first actuator distal end 184, and means for controlling the assembly 190.

Figure 7:
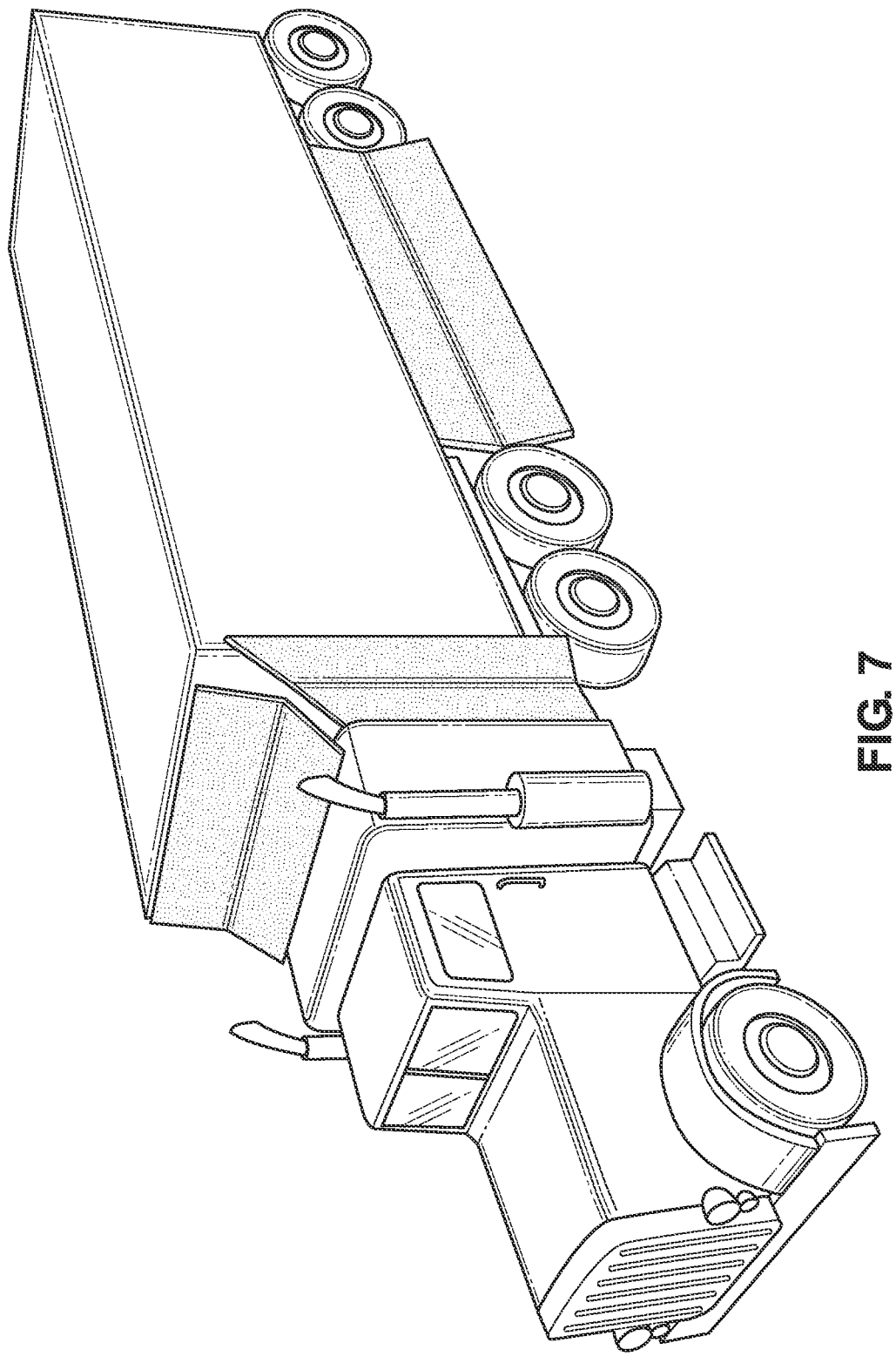
FIG. 7 is a front perspective view of the preferred skirt assemblies illustrated in FIGS. 4-6 shown in an open position and disposed on the top and driver's side of the cab and the longitudinal driver's side of the trailer of an exemplary motor vehicle.

Referring now to FIG. 7, a front perspective view of preferred skirt assembly 120 is illustrated in a partially open position and disposed on the top and driver's side of the cab and the longitudinal driver's side of the trailer of exemplary motor vehicle 130.

Figure 8:
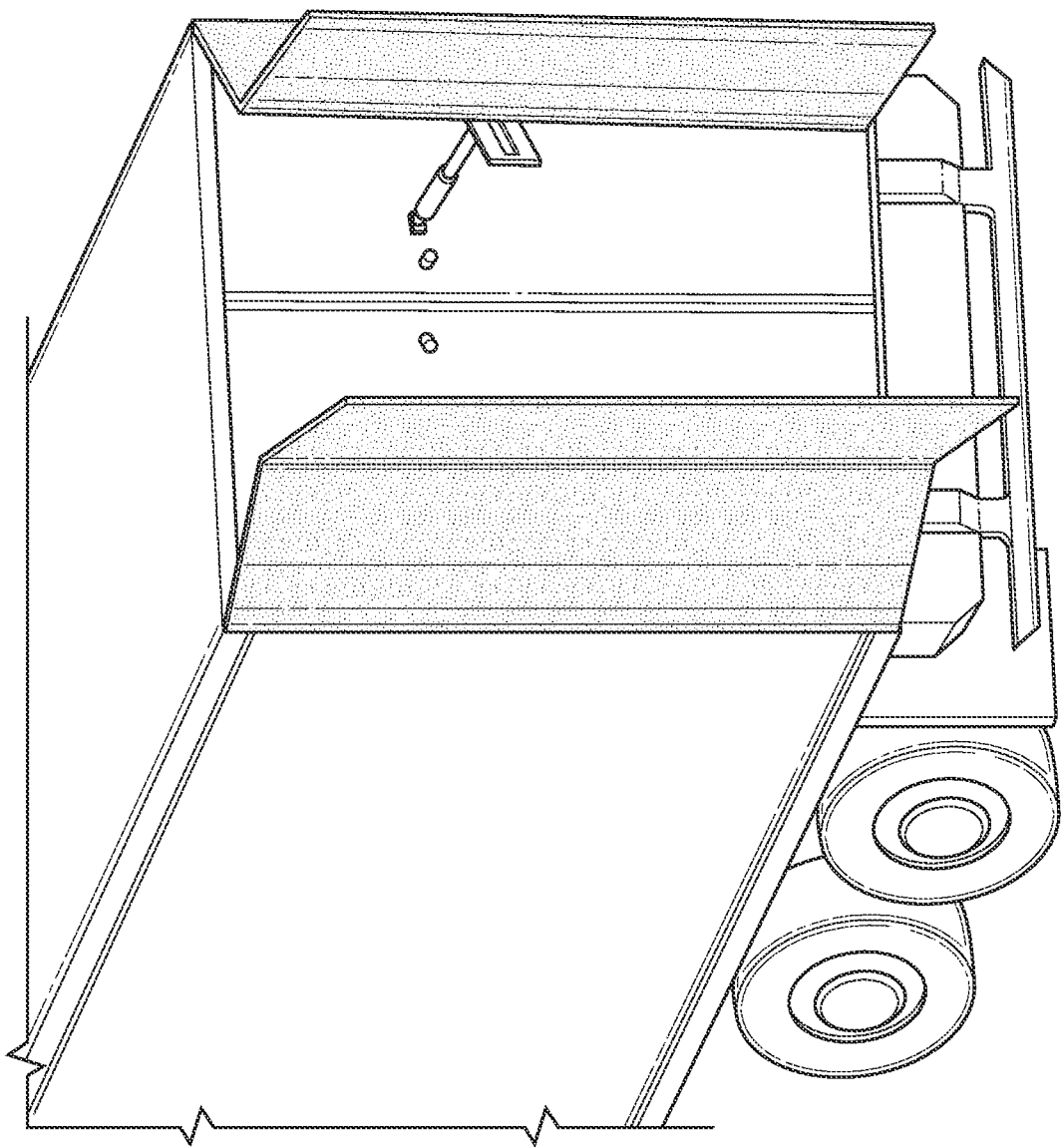
FIG. 8 is a rear perspective view of the preferred skirt assembly illustrated in FIGS. 4-7 shown in a partially open position and disposed on the rear end of the trailer of an exemplary motor vehicle.

Referring now to FIG. 8, a rear perspective view of a pair of preferred skirt assemblies 120 is illustrated in a partially open position and disposed on the rear end of the trailer of exemplary motor vehicle 130. As shown in FIG. 8, preferred skirt assembly 120 comprises first panel 140, second panel 150, and first actuator 180. While FIG. 8 does not illustrate a skirt assembly on the top of the rear end of the trailer, it is contemplated within the scope of the invention that a skirt assembly could be provided along the top of the rear end of the trailer.

The invention also comprises a method for controlling a skirt assembly adapted for use on a motor vehicle. The preferred method comprises providing the skirt assembly. The preferred skirt assembly comprises a first panel having a first panel proximal end and a first panel distal end spaced apart from the first panel proximal end. The preferred first panel proximal end is pivotally attached to the motor vehicle. The preferred skirt assembly also comprises a second panel having a second panel proximal end and a second panel distal end spaced apart from the second panel proximal end. The preferred second panel proximal end is pivotally attached to the first panel distal end. The preferred skirt assembly further comprises a first rod having a first rod lateral end and a first rod medial end spaced apart from the first rod lateral end. The preferred first rod lateral end is pivotally attached to the first panel between the first panel proximal end and the first panel distal end. The preferred skirt assembly still further comprises a second rod having a second rod lateral end and a second rod medial end spaced apart from the second rod lateral end. The preferred second rod lateral end is pivotally attached to the second panel between the second panel proximal end and the second panel distal end. In addition, the preferred skirt assembly comprises a first actuator having a first actuator proximal end and a first actuator distal end spaced apart from the first actuator proximal end. The preferred first actuator proximal end is pivotally attached to the motor vehicle, and the preferred first actuator distal end is pivotally attached to the first panel distal end and the second panel proximal end. Preferably, the first actuator is adapted to move between a retracted position and an extended position, and the skirt assembly is adapted to be moved between an open position and a closed position when the first actuator moves between the extended position and the retracted position. The preferred method also comprises moving the first actuator between the retracted position and the extended position.

In an alternative embodiment, the invention comprises a method for controlling a skirt assembly adapted for use on a motor vehicle. The preferred method comprises providing the skirt assembly. The preferred skirt assembly comprises a first panel having a first panel proximal end and a first panel distal end spaced apart from the first panel proximal end. The preferred first panel proximal end is pivotally attached to the motor vehicle. The preferred skirt assembly also comprises a second panel having a second panel proximal end and a second panel distal end spaced apart from the second panel proximal end. The preferred second panel proximal end is pivotally attached to the first panel distal end. The preferred skirt assembly further comprises a first actuator having a first actuator proximal end and a first actuator distal end spaced apart from the first actuator proximal end. The preferred first actuator proximal end is pivotally attached to the motor vehicle. The preferred first actuator distal end is pivotally attached to the first panel between the first panel proximal end and the first panel distal end. The preferred skirt assembly still further comprises a means for moving the second panel between an open position and a closed position. Preferably, the first actuator is adapted to move between a retracted position and an extended position, and the first panel of the skirt assembly is adapted to be moved between an open position and a closed position when the first actuator moves between the extended position and the retracted position. The preferred method also comprises moving the first actuator between the retracted position and the extended position, and moving the second panel between the closed position and the open position.

In operation, several advantages of the preferred embodiments of the skirt assembly are achieved. For example, the preferred embodiments of the skirt assembly reduce the size of gaps, drag, turbulence, and weight. The preferred embodiments of the skirt assembly also improve aerodynamics, mileage, vehicle stability, and skirt assembly durability and lifespan. The preferred embodiments of the skirt assembly further reduce maintenance, repair, and replacement costs. The preferred embodiments of the skirt assembly are longer and extend greater distances. The preferred embodiments of the skirt assembly are simpler, less complex, and easily retrofitted and/or installed. In addition, the preferred embodiments of the skirt assembly are capable of negotiating sharp turns, speed bumps, railroad tracks, snow, mud, etc. without damage. The preferred embodiments of the skirt assembly may also be disposed at multiple locations on a motor vehicle, including the rear, front top, front sides, and undercarriage. The preferred embodiments of the skirt assembly may also be controlled remotely by GPS, speedometer, and/or manually.

Although this description contains many specifics, these should not be construed as limiting the scope of the invention but as merely providing illustrations of some of the presently preferred embodiments thereof, as well as the best mode contemplated by the inventors of carrying out the invention. The invention, as described herein, is susceptible to various modifications and adaptations, and the same are intended to be comprehended within the meaning and range of equivalents of the appended claims.

What is claimed is:

1. A skirt assembly adapted for use on a motor vehicle, said skirt assembly comprising:
   a. a first panel, said first panel having a first panel proximal end and a first panel distal end spaced apart from the first panel proximal end, and said first panel proximal end being pivotally attached to the motor vehicle;
   b. a second panel, said second panel having a second panel proximal end and a second panel distal end spaced apart from the second panel proximal end, and said second panel proximal end being pivotally attached to the first panel distal end;
   c. a first rod, said first rod having a first rod lateral end and a first rod medial end spaced apart from the first rod lateral end, and said first rod lateral end being pivotally attached to the first panel between the first panel proximal end and the first panel distal end;
   d. a second rod, said second rod having a second rod lateral end and a second rod medial end spaced apart from the second rod lateral end, and said second rod lateral end being pivotally attached to the second panel between the second panel proximal end and the second panel distal end;
   e. a first actuator, said first actuator having a first actuator proximal end and a first actuator distal end spaced apart from the first actuator proximal end, and said first actuator proximal end being pivotally attached to the motor vehicle, and said first actuator distal end being pivotally attached to the first panel distal end and the second panel proximal end;
   wherein the first actuator is adapted to move between a retracted position and an extended position; and wherein the skirt assembly is adapted to be moved between an open position and a closed position when the first actuator moves between the extended position and the retracted position.

2. The skirt assembly of claim 1 wherein the first actuator comprises a hydraulic cylinder.

3. The skirt assembly of claim 1 further comprising a means for controlling the assembly.

4. The skirt assembly of claim 3 wherein the means for controlling the assembly is adapted to remotely control the assembly.

5. The skirt assembly of claim 3 wherein the means for controlling the assembly comprises a global positioning satellite assembly.

6. The skirt assembly of claim 3 wherein the means for controlling the assembly comprises a speedometer.

7. The skirt assembly of claim 3 wherein the means for controlling the assembly is manually operated.

8. The skirt assembly of claim 3 wherein the means for controlling the assembly is automatic.

9. A skirt assembly adapted for use on a motor vehicle, said skirt assembly comprising:
   a. a first panel, said first panel having a first panel proximal end and a first panel distal end spaced apart from the first panel proximal end, and said first panel proximal end being pivotally attached to the motor vehicle;
b. a second panel, said second panel having a second panel proximal end and a second panel distal end spaced apart from the second panel proximal end, and said second panel proximal end being pivotally attached to the first panel distal end;
c. a first actuator, said first actuator having a first actuator proximal end and a first actuator distal end spaced apart from the first actuator proximal end, and said first actuator proximal end being pivotally attached to the motor vehicle, and said first actuator distal end being pivotally attached to the first panel between the first panel proximal end and the first panel distal end;
d. a means for moving the second panel between an open position and a closed position; and,
wherein the first actuator is adapted to move between a retracted position and an extended position; and wherein the first panel of the skirt assembly is adapted to be moved between an open position and a closed position when the first actuator moves between the extended position and the retracted position.

10. The skirt assembly of claim 9 wherein the first actuator comprises a hydraulic cylinder.

11. The skirt assembly of claim 9 wherein the means for moving the second panel comprises a spring-loaded device.

12. The skirt assembly of claim 9 wherein the means for moving the second panel comprises a rod.

13. The skirt assembly of claim 9 further comprising a means for controlling the assembly.

14. The skirt assembly of claim 13 wherein the means for controlling the assembly is adapted to remotely control the assembly.

15. The skirt assembly of claim 13 wherein the means for controlling the assembly comprises a global positioning satellite assembly.

16. The skirt assembly of claim 13 wherein the means for controlling the assembly comprises a speedometer.

17. The skirt assembly of claim 13 wherein the means for controlling the assembly is manually operated.

18. The skirt assembly of claim 13 wherein the means for controlling the assembly is automatic.

19. A method for controlling a skirt assembly adapted for use on a motor vehicle, said method comprising:
(a) providing the skirt assembly, said skirt assembly comprising:
(i) a first panel, said first panel having a first panel proximal end and a first panel distal end spaced apart from the first panel proximal end, and said first panel proximal end being pivotally attached to the motor vehicle;
(ii) a second panel, said second panel having a second panel proximal end and a second panel distal end spaced apart from the second panel proximal end, and said second panel proximal end being pivotally attached to the first panel distal end;
(iii) a first rod, said first rod having a first rod lateral end and a first rod medial end spaced apart from the first rod lateral end, and said first rod lateral end being pivotally attached to the first panel between the first panel proximal end and the first panel distal end;
(iv) a second rod, said second rod having a second rod lateral end and a second rod medial end spaced apart from the second rod lateral end, and said second rod lateral end being pivotally attached to the second panel between the second panel proximal end and the second panel distal end;
(v) a first actuator, said first actuator having a first actuator proximal end and a first actuator distal end spaced apart from the first actuator proximal end, and said first actuator proximal end being pivotally attached to the motor vehicle, and said first actuator distal end being pivotally attached to the first panel distal end and the second panel proximal end;
wherein the first actuator is adapted to move between a retracted position and an extended position; and wherein the skirt assembly is adapted to be moved between an open position and a closed position when the first actuator moves between the extended position and the retracted position;
(b) moving the first actuator between the retracted position and the extended position.

20. A method for controlling a skirt assembly adapted for use on a motor vehicle, said method comprising:
(a) providing the skirt assembly, said skirt assembly comprising:
(i) a first panel, said first panel having a first panel proximal end and a first panel distal end spaced apart from the first panel proximal end, and said first panel proximal end being pivotally attached to the motor vehicle;
(ii) a second panel, said second panel having a second panel proximal end and a second panel distal end spaced apart from the second panel proximal end, and said second panel proximal end being pivotally attached to the first panel distal end;
(iii) a first actuator, said first actuator having a first actuator proximal end and a first actuator distal end spaced apart from the first actuator proximal end, and said first actuator proximal end being pivotally attached to the motor vehicle, and said first actuator distal end being pivotally attached to the first panel between the first panel proximal end and the first panel distal end;
(iv) a means for moving the second panel between an open position and a closed position;
wherein the first actuator is adapted to move between a retracted position and an extended position; and wherein the first panel of the skirt assembly is adapted to be moved between an open position and a closed position when the first actuator moves between the extended position and the retracted position;
(b) moving the first actuator between the retracted position and the extended position; and,
(c) moving the second panel between the closed position and the open position.

* * * * *